Figure 1:
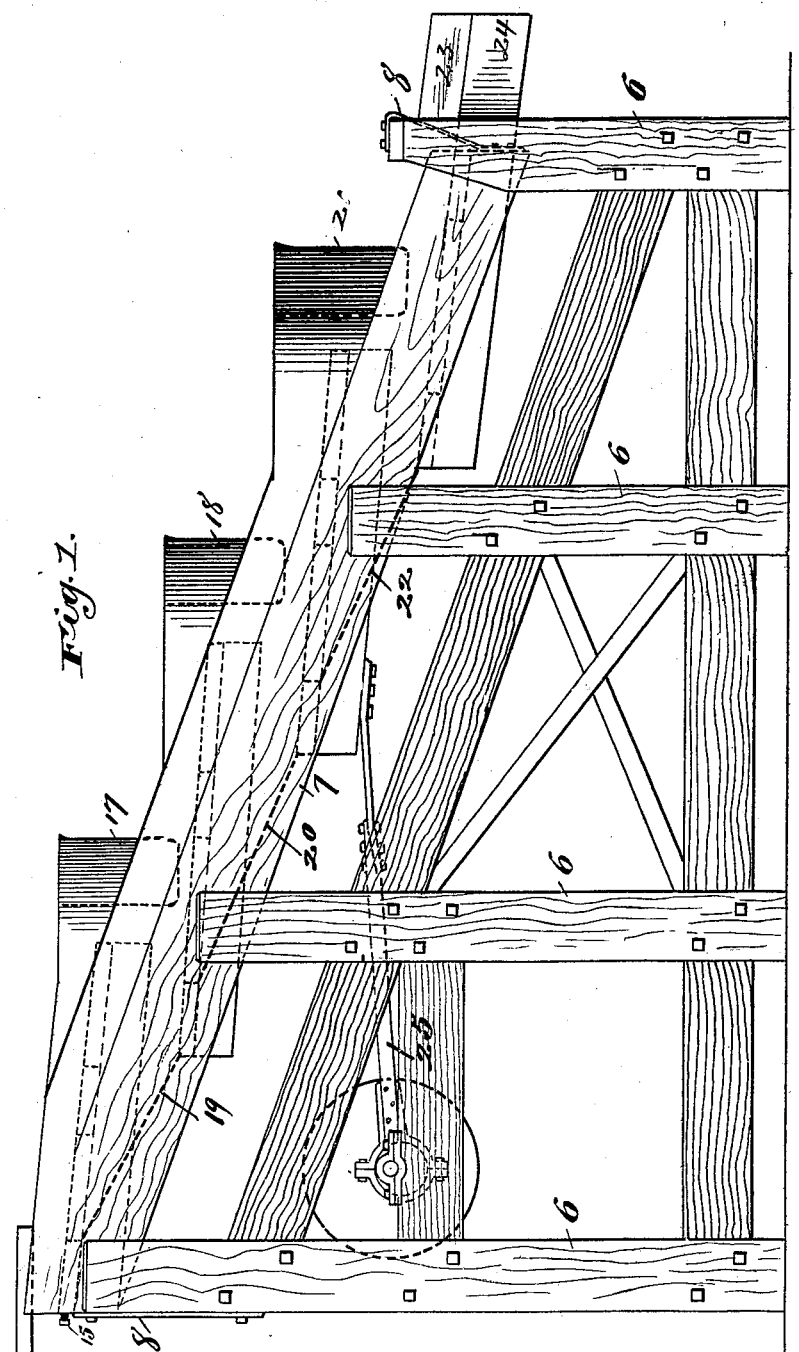

No. 621,788. Patented Mar. 28, 1899.
J. J. BUDLONG.
VEGETABLE SORTER.
(Application filed Feb. 1, 1898.)
(No Model.) 3 Sheets—Sheet 1.

Witnesses,
Inventor,

No. 621,788. Patented Mar. 28, 1899.
J. J. BUDLONG.
VEGETABLE SORTER.
(Application filed Feb. 1, 1896.)
(No Model.) 3 Sheets—Sheet 2.

Witnesses, Inventor,

No. 621,788. Patented Mar. 28, 1899.
J. J. BUDLONG.
VEGETABLE SORTER.
(Application filed Feb. 1, 1896.)
(No Model.) 3 Sheets—Sheet 3.
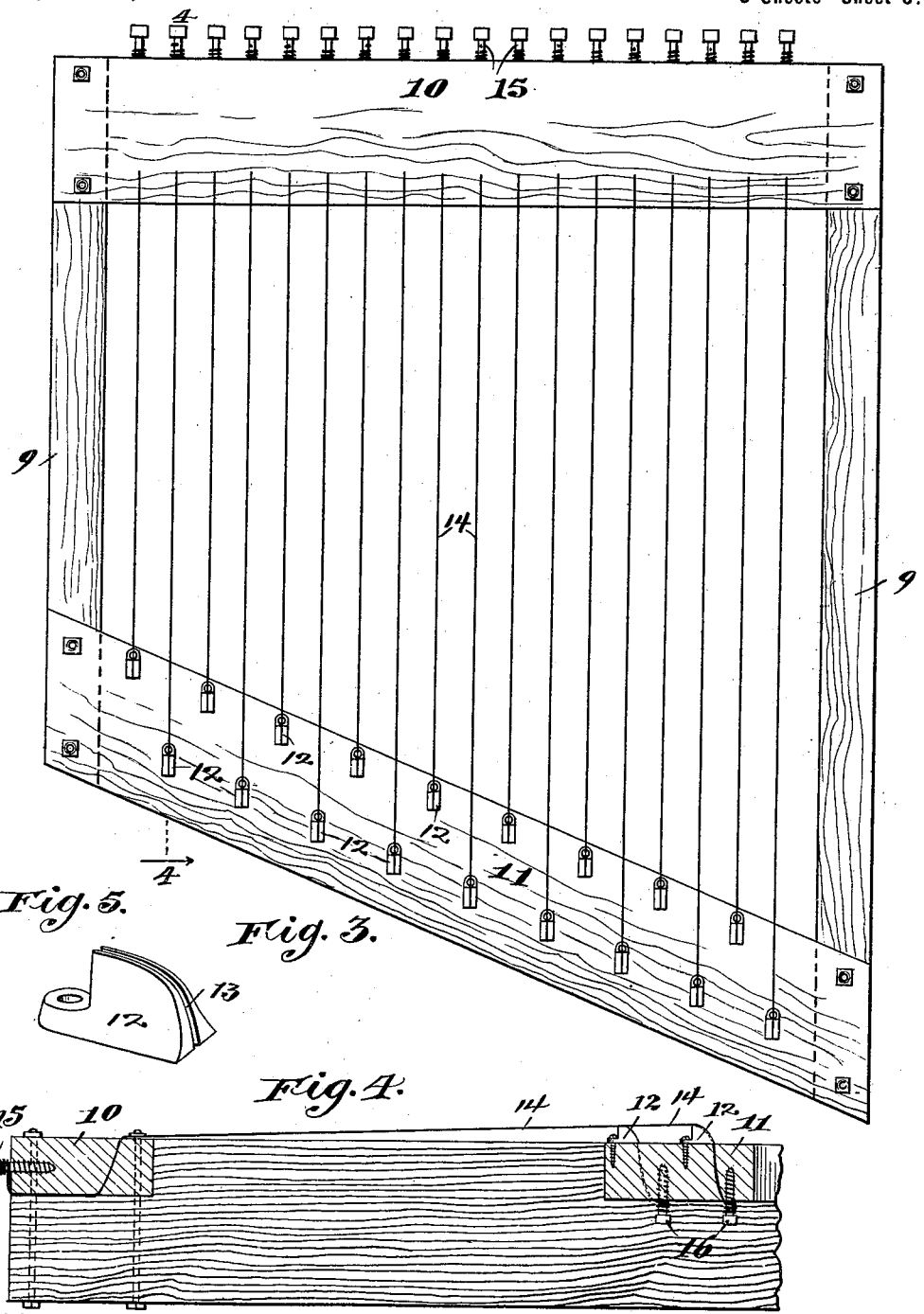

UNITED STATES PATENT OFFICE.

JOSEPH J. BUDLONG, OF CHICAGO, ILLINOIS.

VEGETABLE-SORTER.

SPECIFICATION forming part of Letters Patent No. 621,788, dated March 28, 1899.

Application filed February 1, 1896. Serial No. 577,685. (No model.)

*To all whom it may concern:*

Be it known that I, JOSEPH J. BUDLONG, of Chicago, Illinois, have invented certain new and useful Improvements in Vegetable-Sorters, of which the following is a specification.

This invention relates to an apparatus for sorting or grading vegetables, and it is particularly applicable to the sorting or grading of pickles according to size.
The invention comprises in the preferred construction a series of shaking-grates, each composed of a framework having an open interior crossed by a series of tightly-stretched wires. Each frame (of which there may be as many as desired) is preferably separately constructed, so as to make them separately removable, and the entire series is preferably interconnected, so as to be reciprocated or shaken by a single pitman or other driving mechanism. The series of frames are preferably mounted in a framework so that each frame shall project at one end over the other, the several frames being placed at different elevations and at suitable vertical distances from each other. They may, however, be arranged in vertical series. Each frame has an oblique or diagonal delivery edge and is provided with a chute or trough to receive the material delivered over such edge and carried to the sides of the machine, the frames having an "end shake," and the vegetables to be sorted or graded and which do not pass through the openings of any one frame will be delivered from said frame into the delivery-chute and conducted therethrough to the side of the machine. The several frames are so arranged that the one having the widest spaces or openings between its wires receives the entire mass to be sorted, and the entire mass passes through except the largest size. The vegetables which are small enough to pass through the meshes of the first frame are next delivered onto the second, where the next larger size is taken out, and so on to the end of the series, the smallest size falling through the last screen or frame. It is of the greatest importance that in its particular construction each frame should be so made as to prevent lodgment of the vegetables thereon. To this end I employ, in order to form the mesh, piano-wires, which are put under very great tension. I also provide special castings or rests for the wires and so arranged as to form no obstruction to the moving vegetables, and I
provide a convenient means for further tensioning the wires when desired.

Figure 2:
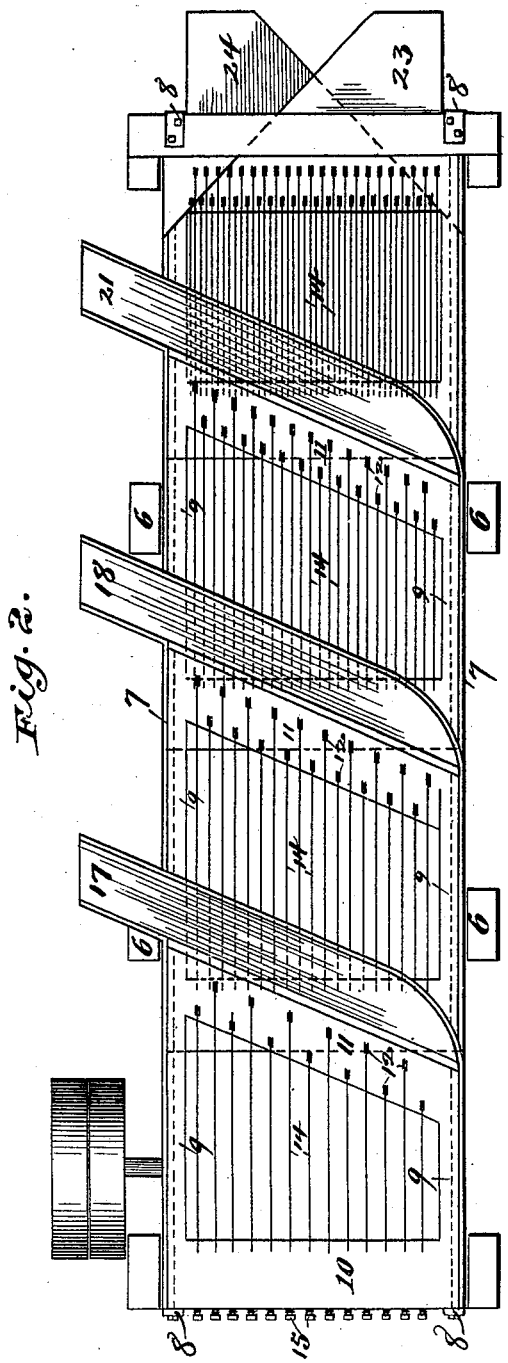

In the accompanying drawings, Figure 1 is a side elevation showing the apparatus comprising four frames with a delivery-table in proper position to the upper one of the series. Fig. 2 is a plan view of the same with the table omitted. Fig. 3 is a detail view of one of the frames or screens. Fig. 4 is a broken transverse section of the same on the line 4 4, looking in the direction of the arrow; and Fig. 5 is a detail of one of the wire-supports.

In the drawings, let 6 represent a skeleton framework, in which is suspended, so as to reciprocate endwise, a frame 7, the means of suspension shown being straps 8, connected to the posts of the framework and to the side pieces of the shaking-frame. Within this shaking-frame 7 are arranged in any convenient manner a series of frames, such as shown in Fig. 3, and consisting of the side pieces 9, the front bar 10, and a rear bar 11. One of the bars 9 is longer than the other, and the rear bar 11 is arranged obliquely to the front bar 10, so that the delivery edge of the frame is oblique to the sides. On the rear bar 11 is mounted a series of support-blocks 12, (shown in Fig. 5,) said support-blocks having continuous grooves 13 in their upper edges, and said upper edge being thin, so as to present no obstruction to the articles passing over the wires. These support-blocks may be fastened by a screw to the rear bar 11. The wires 14 are preferably of the grade known as "piano-wire," and capable of withstanding great tension. They are secured by passing their rear ends through apertures in the front bar 10 and engaging them with screw-bolts 15, say, by passing the end of the wire through a hole in the shank of the bolt. Said bolts are threaded into the rear edge of the bars 10, and by turning them the wires may be tightly drawn. The opposite ends of the wires are carried over the grooves in the blocks 12 and threaded through apertures in the bar 11, being connected to bolts 16 of similar construction to those marked 15, except that these bolts are shown as entering the rear bar 11 from its lower side. These frames may be slipped into or rest on cleats or be connected in any other convenient way to the shaking-frame 7.

The mesh of the several screen-frames will vary according to the character of the material which is being sorted or graded. I have employed the apparatus in the sorting of pickles and have made the upper screen with openings between the wires of an inch and a half. Through these spaces all but the largest size of the pickles will pass. The material to be sorted may be fed from the table 16 upon the upper screen-frame, and, falling thereon while the latter is being reciprocated, all but the largest size will pass through the mesh. Those of the largest size which do not pass through the openings between the wires are delivered over the oblique edge of the upper frame into a delivery chute or trough 17. All the goods passing through the meshes of the upper frame pass down an incline (indicated at 19, Fig. 1) to and upon the wires of the second frame. The spaces between the wires of this second frame are narrower than those of the first, and hence a smaller size or grade of the goods are retained and pass off at the oblique delivery edge into the trough 18, all those sizes passing through the second frame being delivered over the incline 20 upon the third frame, where another size is taken out and delivered by way of the chute 21. The goods then pass on to the last screen of the series over the incline 22, and one size too large to pass through the spaces of said screen-frame are delivered out through the chute 23, while those that passed through the spaces are delivered through the chute 24.

An endwise reciprocation or shaking motion is imparted to the entire series of screen-frames by any suitable driving mechanism—such, for example, as the pitman 25—driven from an eccentric or crank.

Other working adjuncts may be employed—as, for example, an elevator—for delivering the goods upon the feed-table and conveyers for receiving the several grades and carrying them away. The apparatus may also be extended or contracted as to the number of the screen-frames and the particular construction of the frames, while the best known to me and highly efficient in securing practical results may be varied without departure from the spirit and scope of the invention.

An important feature is the arrangement of the screen-frames in such order that the largest sizes shall be first taken out. The reverse of this arrangement has usually been employed, but is impractical in the sorting of vegetables, because the smaller sizes are supported by the larger and are carried over with them instead of being all delivered out through the first frame.

By reason of the obliquity of the delivery edge of the frames the delivery-chutes are also given an oblique position, which causes them to feed along and discharge their contents when the frames are reciprocated, while the screen-surface is continuous up to the chute, and no working space is lost.

While I have described my apparatus as being peculiarly adapted to the sorting and grading of pickles, it may be employed with other vegetables and fruits and will be found adequate for grading of raisins and other sticky fruits or substances which have heretofore been found difficult to properly grade or sort.

I claim—

1. In a vegetable-sorter, a frame having an open interior, wires stretched across said open interior parallel to the sides of the frame, the ends of said wires next to the delivery edge of the frame being elevated above the surface of the frame and said wires being flush with the frame at the receiving end, substantially as and for the purpose described.

2. In a vegetable-sorter, a screen-frame having in combination rigid side pieces of unequal length, wires stretched parallel to said sides, a rear bar connecting said sides and having tension devices to which the wires are secured, an obliquely-arranged rear bar, supports or bridge-pieces mounted on the rear bar having thin upper edges and grooves in said edges to receive the wires and adjustable tension devices to which the front ends of said wires are secured, substantially as described.

JOSEPH J. BUDLONG.

Witnesses:
L. F. McCREA,
FREDERICK C. GOODWIN.